United States Patent [19]

Works et al.

[11] 3,881,100

[45] Apr. 29, 1975

[54] REAL-TIME FOURIER TRANSFORMATION APPARATUS

[75] Inventors: George A. Works, Wayland; Harry Vickers, Oakham, both of Mass.

[73] Assignee: Raytheon Company, Lexington, Mass.

[22] Filed: Oct. 30, 1973

[21] Appl. No.: 411,101

Related U.S. Application Data

[60] Division of Ser. No. 201,948, Nov. 24, 1971, Pat. No. 3,816,729, which is a continuation of Ser. No. 863,776, Oct. 6, 1969, abandoned.

[52] U.S. Cl. .................................................. 235/156

[51] Int. Cl. .............................................. G06f 15/34

[58] Field of Search ......... 235/156; 324/77 B, 77 D, 324/77 G, 77 H

[56] References Cited

UNITED STATES PATENTS

| | | | |
|---|---|---|---|
| 3,517,173 | 6/1970 | Gilmartin, Jr. et al. | 235/156 |
| 3,544,775 | 12/1970 | Bergland et al. | 324/77 X |
| 3,573,446 | 4/1971 | Bergland | 235/156 |
| 3,588,460 | 6/1971 | Smith | 235/156 |

OTHER PUBLICATIONS

G. D. Bergland & H. W. Hale, "Digital Real-Time Spectral Analysis," IEEE Trans. on Electronic Computers, Apr. 1967, pp. 180–185.

*Primary Examiner*—Charles E. Atkinson
*Assistant Examiner*—David H. Malzahn
*Attorney, Agent, or Firm*—John R. Inge; Joseph D. Pannone; Milton D. Bartlett

[57] ABSTRACT

An apparatus for performing real-time Fourier transformation of a time varying signal by taking successive digital samples in a shift register means and repeatedly transforming preselected pairs of said samples as the samples are progressively shifted down the register. The successive samples are ordered in the register in a binary sequence from 0 to $2^n-1$ while the pairs are selected when the binary distance between them is equal to $2^{n-m}$, $m$ being the transformation number, each pair $x_{a,m}$, $X_{b,m}$ being related to its transformed magnitude $X_{a,m+1}$ and $X_{b,m+1}$ by the relations $$X_{a,m+1} = X_{a,m} + X_{b,m}e^{j\phi}$$
$$X_{b,m+1} = X_{a,m} - X_{b,m}e^{j\phi}$$

where $\phi$ is the radian value determined by the transform number in and the position of the sample pair $X_{a,m}$, $X_{b,m}$ in their original position order of succession.

9 Claims, 11 Drawing Figures

FIG. 1
DIAGRAM OF COOLEY TUKEY FFT ALGORITHM
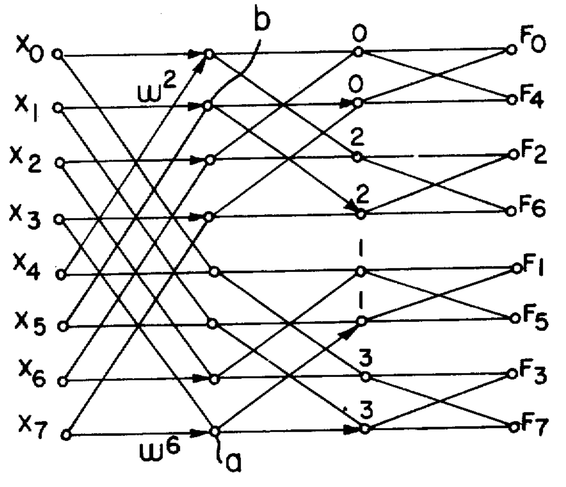
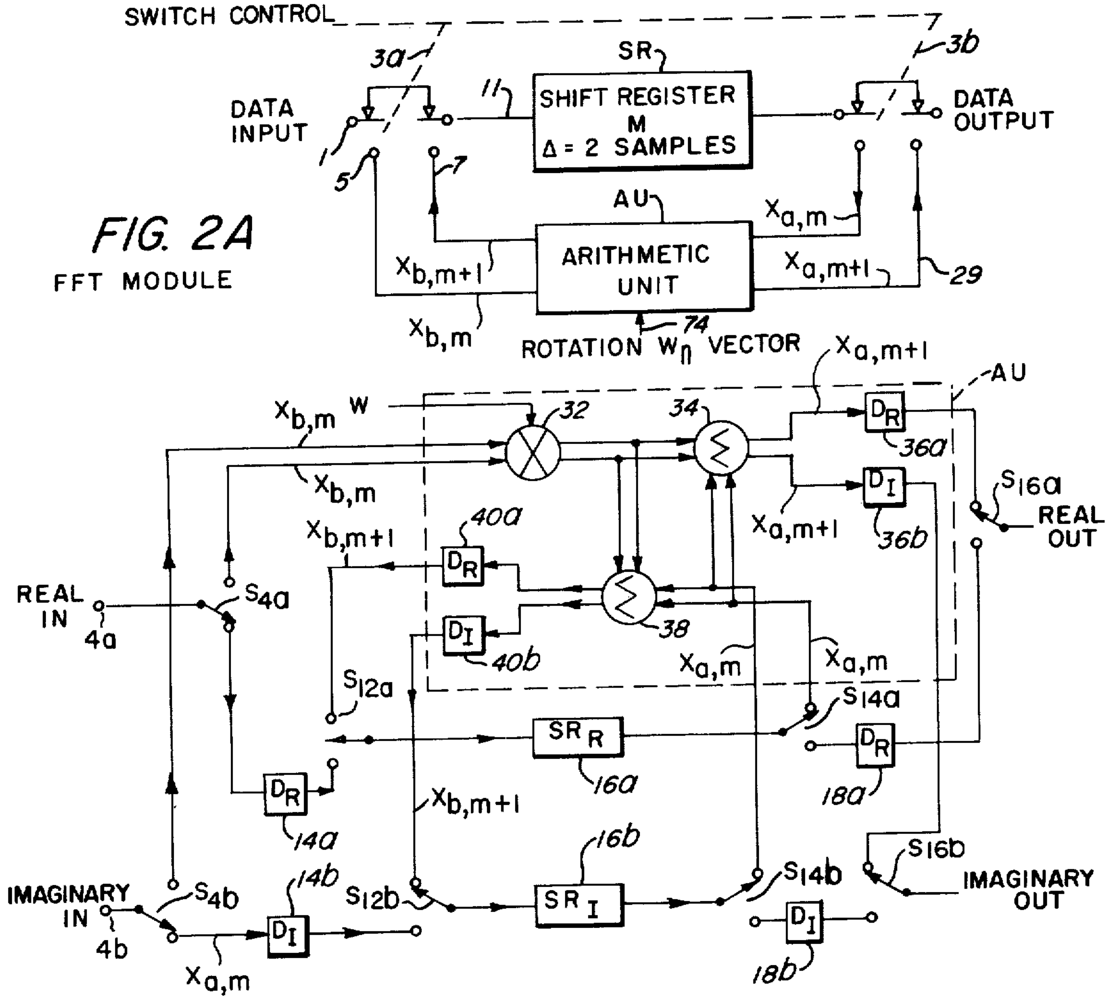
FIG. 2A FFT MODULE, FIG. 2B

FFT PROCESSOR

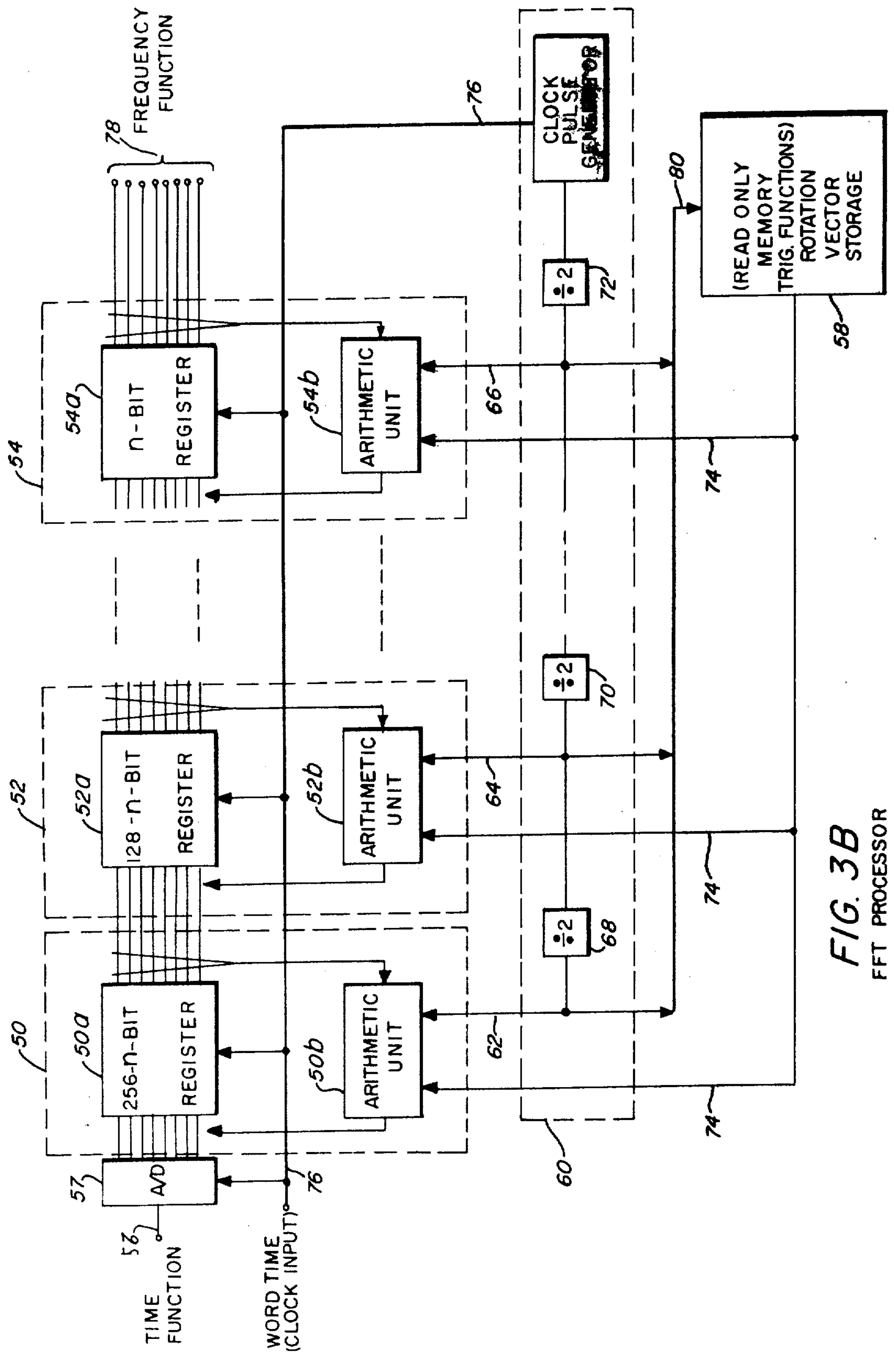
FIG. 3B FFT PROCESSOR

POINT OF TRANSFORM

REAL-TIME FOURIER TRANSFORMATION APPARATUS

CROSS REFERENCE TO RELATED APPLICATIONS

This is a division of application Ser. No. 201,948 filed Nov. 24, 1971 now U.S. Pat. No. 3,816,729, which is a streamlined continuation of application Ser. No. 863,776 filed Oct. 6, 1969, now abandoned.

BACKGROUND OF THE INVENTION

This invention relates to improvements in real-time signal processing, and more particularly, to real-time digitalized Fourier transformation of signals. The following paragraphs briefly describe the relevant attempts to mechanize, using analog and digital apparatus, the computation of these transforms. First, the Fourier transform and signal processing is discussed to provide a basis for appreciating the real-time requirements. Second, the discussion centers on the problem of squaring real-time requirements with the use of general purpose digital computers. Lastly, consideration is given to the limitations of the current Fast Fourier Transform technique as used on digital computers.

Fourier Transforms and Signal Processing

The Fourier transform of a signal greatly enhances certain signal characteristics such as energy or amplitude distribution as a function of frequency. This helps discriminate between a signal and noise. Typically, a transmission environment includes broad-band noise. Such noise has a fairly uniform distribution of energy over a large frequency range. In contrast, the Fourier transformation of a signal will show a great deal of energy concentrated in a comparatively narrow frequency band. The Fourier relation is said to map a signal from the time domain into the frequency domain. Mathematically, the relation between a signal as a function of time $x(t)$ and the transformation as a function of frequency $X(w)$ is $$X(w)=\int_{-\infty}^{+\infty} x(t)e^{-jwt}dt$$

In this formulation, $x(t)$ is an analytic continuous function. It, theoretically, requires integration of an infinite time interval and a knowledge of the future. However, the capacity of the transform to yield frequency spectrum information about a time varying signal greatly outweighs the failure of real world electrical signals to conform to the exactitude of mathematical analytic continuity. This is illustrated in the following several examples.

A. B. Cunningham et al., U.S. Pat. No. 3,087,674 issued on Apr. 30, 1963, shows an analog Fourier transformation apparatus in which a time varying electrical signal $x(t)$ is partitioned to form sinusoidal component product signals $x(t)$ sin $w_it$ and $x(t)$ cos $w_it$. These product signals are in turn integrated over time to yield $\int x(t) \sin w_it\, dt$ and $\int x(t) \cos w_it\, dt$. Finally, the integrated product signals are combined to form an output signal $X(w)$ such that $$|X(w)| = [\,|\int x(t) \sin (wt)\, dt|^2 + |\int x(t) \cos (wt)\, dt|^2]^{1/2}$$

By varying the given frequency of the range of interest $w_i$, $W_1 \leq w_i \leq W_2$ and recording the magnitude $|X(w_i)|$ at each $w_i$ there is obtained an analog record corresponding to a Fourier transformation of the signal $x(t)$.

Spectrum analyzers often include a bank of tuned narrow band width contiguous filters whose output yields a voltage versus frequency spectrum. The square of the voltage versus frequency is proportional to the power density spectrum of the corresponding signal. Also, a Doppler radar range gate filter bank is one illustrative example of such a spectrum analyzer. In this regard, the filter bank may be thought of as a two-dimensional spectrum of range versus Doppler frequency. Reference also may be made to a voice communication example of M. R. Schroeder, U.S. Pat. No. 3,344,349 issued on Sept. 26, 1967.

Real-Time Fourier Transform Processing

A system reacts in real time when the complete response of a stimulated system occurs at, or about, the same time as the stimulus. Generally, where a system needs the results of processing a time varying signal (stimulus) immediately, then a very broadband width system is required. Such an overall signal processing requirement exists for the Fourier transformation of radar echo returns. To impose the microsecond response time requirements of volume radar data upon prior art analog systems, in addition to a high degree of accuracy and precision, would clearly exceed all reasonable bounds of cost, size, weight and power. Attention is directed to both Cunningham et al. and Schroeder as illustrative of the high degree of complexity of even the low frequency band width analog processing arrangement.

Prior Art Digitalization of Fourier Transform Process

If digital techniques are to be used for analyzing continuous waveforms, then it is necessary that the data be sampled (usually at equally spaced intervals of time) in order to produce a time series of discrete samples which can be fed into a digital computer. This time series can completely represent the continuous waveform, if the waveform is frequency band-limited and the samples are taken at a rate at least twice the highest frequency present in the waveform.

A Discrete Fourier Transform (DFT) suitable for digital computational use is described in William T. Cochran et al., Proceedings of the IEEE, Volume 55, Number 10, October 1967 at pages 1665 to 1667. The DFT is defined by the relation:

$$X_r=\sum_{k=0}^{N-1} x_k e^{-2\pi j rk/N}$$

where $X_r$ is the $r^{th}$ component of the DFT; $x_k$ denotes the $k^{th}$ sample of the time series consisting of N samples; $r=0, 1, 2, -N-1$; and where $j=\sqrt{-1}$. Cochran further shows the substantial equivalence of DFT to the continuous Fourier transform. Inspection of the above DFT relation reveals that each $x_k$ must be multiplied N times to form N sums. Since there are N different values of $x_k$, there must be computed $N^2$ multiplications and $N^2$ additions.

Programs for performing the DFT on general purpose digital computers have long been extant. However, there are severe limitations to the speed with which such machines can execute the programs. Typical processing times are in the order of 50 milliseconds. In contrast, the channel capacities (data volume) of such systems are not sufficient to accommodate real-time radar data processing. Illustratively, a radar having a one microsecond pulse width may require a data rate of 20 million bits per second.

The limitations of a general purpose device arise from the fact that such machines access main memories serially. Many of these have word organized memories. Even the "look ahead" machines, such as the IBM 7094 (STRETCH), are limited to the extraction of only a few words at a time from main core. Where data is packed and extracted on a word basis, there is difficulty in accessing different units in different addresses. Thus, what emerges from the early attempted digital processing was the need for a machine in which the data was accessible in parallel and byte organized.

The Fast Fourier Transform and Digitization

The Fast Fourier Transform (FFT) is an algorithm for computing the Discrete Fourier Transform (DFT) of a series of N (complex numbers) data points in approximately $N \log_2 N$ operations. As was pointed out by James W. Wooley et al., Proceedings of the IEEE, Volume 55, Number 10 at pages 1675 to 1677, the FFT algorithm was devised specifically because the DFT requiring $N^2$ operations was using "hundreds of machine hours of computing time". To appreciate FFT, it is necessary to understand some of its derivation and relation to DFT.

It should be recalled that in DFT $$X_r = \Sigma\, x_k e^{-j2\pi\, rk/N};\ \text{let } 2\pi rk/N = \phi.$$

Then $X_r = \Sigma x_k e^{-j\phi}$ where $e^{j\phi} = \cos\phi + j\sin\phi$.

There are many repetitions in $N^2$ computations of DFT. As an example, at $k = 0$, the product $x_0 e^{j0}$ must be formed N times. Thus, every product term must be formed N times. The FFT algorithm basically seeks to remove such redundancy. For a derivation of the Cooley-Tukey version of FFT, reference is again made to Cochran et al., especially between pages 1667 and 1669.

A variety of notations have been used by different authors in discussing the Fourier transform, DFT and FFT. For convenience all references in this disclosure have been converted to a standard notation; the following table compares Cochran's notation and the standard notation.

| Quantity | Standard | Cochran |
|---|---|---|
| Number of time or frequency samples in a transform block | N | N |
| Base or radix of a transform | R | 2 |
| Number of stages in a radix R transform, equal to $\log_R N$ | n | n |
| $K^{th}$ time sample<br>$r^{th}$ frequency sample | $x_k, y_k, z_k$<br>$X_r, Y_r, Z_r$ | $X_k, Y_k, Z_k$<br>$A_r, B_r, C_r$ |
| $K^{th}$ output from $m^{th}$ stage of FET | $x_{k,m}$ | — |
| Weighting term, or rotation vector, used in transform | $e^{-j\phi} = e^{-j2\pi\, rk/N} = W^{rk}$ | $e^{-j2\pi\, rk/N} = W^{rk}$ |

Briefly, Cochran et al. assumes a time series $x_k$ having N samples divided into two functions $y_k$ and $z_k$, each comprising N/elements or points. $y_k$ comprises even numbered points $x_0, x_2, x_4$ —. $k$ comprises odd numbered points $x_1, x_3, x_5$—. Then, $$y_k = x_{2k}$$
$$z_k = x_{2k+1}$$
$$k = 0, 1, 2, —, N/2 - 1.$$

Let $Y_r$ and $Z_r$ represent the DFT of $y_k$ and $z_k$, respectively. Thus, $$Y_r = \sum_{k=0}^{\frac{N}{2}-1} y_k e^{\frac{-j4\pi rk}{N}}$$

$$Z_r = \sum_{k=0}^{\frac{N}{2}-1} z_k e^{\frac{-j4\pi rk}{N}} \quad r = 0, 1, 2, --- \frac{N}{2} - 1$$

Let $W = e^{-j2\pi/N}$ then $X_r = \Sigma\, x_k W^r = \Sigma\, (y_k + z_k) W^r$

Now for $0 \leq r < N/2$ $$X_r = Y_r + e^{-j2\pi\, r/N} \qquad Z_r = Y_r + W^r Z_r$$

For values of $r > N/2$, the DFT $Y_r$ and $Z_r$ periodically repeat values taken when $r < N/2$. Thus, $$X_r + N/2 = Y_r + Z_r e^{-j2\pi\, (r+N/2)/N} = Y_r - e^{-j2\pi\, r/N} Z_r = Y_r - W^r Z_r$$

for $0 \leq r < N/2$.

According to Cochran, if the input digital data sequence $x_k$ is stored in computer memory in the order, for example, $x_0, x_4, x_2, x_6, x_1, x_5, x_3, x_7$, then the computation may be done "in place". That is, the intermediate results will be "written over" the original data sequence. Thus, no storage is needed beyond that required for the original N complex numbers. However, what Cochran failed to appreciate was that in a general purpose digital computer having serially accessed storage, $R^n$ data words must be transferred from the storage to the arithmetic unit in order to execute a fixed radix R transform upon $N = R^n$ samples. Also, $R^n$ partial results must be transferred from the arithmetic unit back to storage for each of $n$ stages required to compute the transform. Consequently, $2nR^n$ accesses to storage are required.

Summary of the Invention

It is, accordingly, an object of this invention to devise an apparatus for computing Fourier transforms in real time upon input time varying data. It is a related object to devise a digital responsive apparatus having substantially simplified machine organization.

The foregoing objects are attained in a preferred embodiment in which successive digital samples of a time varying signal taken at regularly spaced intervals are inserted into shift register means. Preselected pairs of said samples are repeatedly transformed as the sample pairs are progressively shifted down the register. The successive samples are ordered in the register in a binary sequence from 0 to $2^n-1$. The pairs are so chosen before each transformation such that the binary distance between them is equal to $2^{n-m}$, m being the transformation number. Each pair $X_{a,m}$, $X_{b,m}$ is related to its transformed magnitude $X_{a,m+1}$ and $X_{b,m+1}$ by the relations $$X_{a,m+1} = X_{a,m} + X_{b,m}e^{j\phi}$$

$$X_{b,m+1} = X_{a,m} - X_{b,m}e^{j\phi}$$

where $\phi$ is the radian value determined by the transform number $m$ and position of the sample pair in their inverted position order of succession. In this regard, $e^{j\phi}$ is equivalent to Cochran's $W^r$. The successive signal samples are sequentially shifted such that each sample is selected and transformed $n$ times.

It may be stated as a general proposition that $N!/(N-R)!R!$ different combinations of N samples taken R at a time may be extracted and transformed in apparatus embodying the invention. Experience dictates that the invention is most efficient where R = 2, 3, or 4.

There exist several embodiments of the machine. One embodiment uses an arithmetic unit common to all of the logic modules and time shared among them. Another embodiment uses a separate arithmetic unit for each logic module and is time shared only as between the Real and Imaginary data channels of the logic module. In this latter embodiment, standard modules are serially arranged. Time digital data samples reporting complex numbers are applied at the input of this cascade. Each logic module includes an arithmetic portion which operates upon the digital data sample transferred into the unit. This sample is then progressively shifted down the chain or cascade and transformed at each module.

The successive states or iteration of the fundamental Cooley-Tukey algorithm are each carried out in the separate cascaded modules. In both embodiments, shift registers are used as digital delay lines so as to permit new data to be entered into the processor while the processing of earlier data can be carried out. Advantageously, the overall delay required is only equal to the time necessary to gather the block of data in each of the Real and Imaginary channels. As the last or $N^{th}$ complex data sample is loaded into this digital delay line, the first analysis appears at the output. The output frequencies appear in a sequence associated with the algorithm. A control device, namely, a binary counter, yeilds digital numbers identifying both the channel number and the frequency currently appearing at the output of the shift register digital delay line chain. Additionally, this binary counter specifies the instant at which the separate modules are to be switched and the digital number identifying the sine/cosine values needed by each of the modules.

As mentioned in the Background, the requirement for real-time processing is most in demand with respect to radar information. In this context, data information is obtained at a high volume. In Doppler radar, it is often desired to treat the phase shift information derived from the received echo signals as having a Real and Imaginary component. This is accomplished by multiplying the detected Doppler signal by a sinusoidal function and processing it separately from the same signal multiplied by a sinusoidal function 90° out of phase. Thus, the first stage of the serially connected logic modules may be made to terminate the radar receiver in two parallel interconnected channels, one for processing the Real component of the radar data and the second channel for processing the Imaginary component. Because the transform requires multiplying a portion of the data word in either channel by $e^{j\phi}$, an Imaginary component will be produced as a result of the multiplication. Accordingly, provision is further made for switching the Imaginary component produced by multiplication in the Real channel to the Imaginary channel of the next successive module. Similarly, a Real component produced by multiplication in the Imaginary channel is switchably connected to the Real channel at the next successive module.

It should be apparent that Imaginary components will be produced even if only Real components are present at the data input to the first processing stage. Thus, it is necessary to retain this processing capacity independent of the orthogonality requirements of the data as originally inputted to the FFT processor.

BRIEF DESCRIPTION OF THE DRAWINGS

FIG. 1 is a signal flow graph of an eight-point Cooley-Tukey Fast Fourier Transform algorithm.

FIGS. 2A and 2B, respectively, show a block diagram and a detailed logic diagram of a typical module used in the invention.

FIGS. 3A and 3B show the cascade of modules in relationship to the binary counter stages and the rotation vector storage inputs.

DESCRIPTION OF THE PREFERRED EMBODIMENTS

Figure 3A:
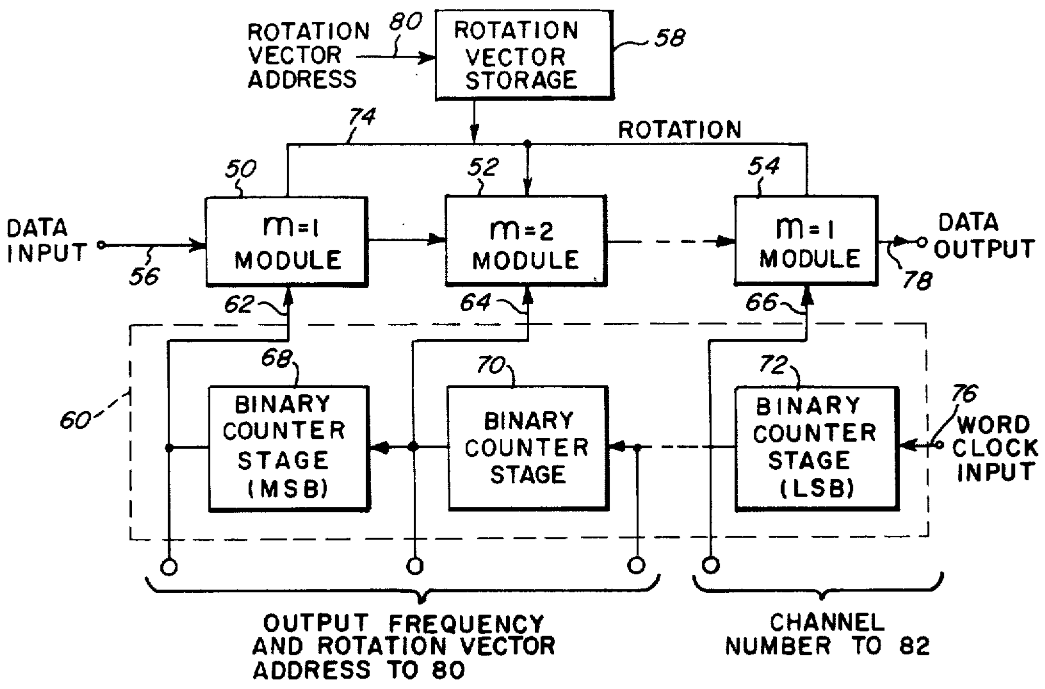

Referring now to FIG. 1 of the drawings, there is shown a signal flow graph of the Cooley-Tukey algorithm. At the left of the graph are the data points $x_0$ through $x_7$ of the time series $x_k$ which are to be transformed by repeated applications of the transform equations. Basically, this signal flow diagram is composed of nodes and arrows terminating in those nodes. The nodes represent the data or the data as transformed. The arrows originate at the nodes whose variables contribute to the value of the variable at the node at which the arrow terminates. The contributions at any node are additive. The weight of each contribution, if other than unity, is indicated by the constant written close to the terminating arrow head. Thus, taking an arbitrary node and designating it $a$ in FIG. 1, it may be seen to be vectorally equal to $x_3 + W^6x_7$. Similarly, taking another arbitrary mode in FIG. 1, $b$ would be equal to $x_5 + W^2x_1$. As previously mentioned, the computation may be done "in place", that is, by writing all intermediate results over the original data sequence. Thus, for example, the value of intermediate computations $a$ and $b$ are needed only for two computations in the next successive transform $T_2$. As mentioned, each of the input nodes affects only the corresponding nodes immediately to the right. If the computation deals with two nodes taken at a time, the newly computed quantites may be written into the registers from which the input values were taken since the input values are no longer needed for further computation ($T_1$). The second step $T_2$ also involves, for example, pairs of nodes. After a new pair of results has been computed, the pair also may be stored in the registers which held the old results and are no longer needed.

A number of important features of the algorithm may be seen by examining this figure. First, each stage follows a succeeding stage from left to right. Accordingly, each stage needs only the data generated from the preceding stage. Second, if each stage processes information in the order of arrival, then the first stage examines data points displaced by half the data length (N/2). The second stage examines data points separated by one quarter the data length (N/4). Third, if the data were available in a continuous stream, then the first stage would process one block of data while the second stage processed the next earlier block of data and so on through all M stages. Fourth, the rotation vector $e^j\phi = W^i$ has the same periodicity as the inverse of the data displacement interval. Finally, the data output is scrambled with respect to the order of the data presented in the input.

Referring now to FIG. 2A, there is shown the basic module component of the invention. The $m^{th}$ module alternately transfers blocks of $2^{n-m}$ data samples at input 1 through switch 3$a$ into the shift register SR on path 11 and into the arithmetic unit AU on line 5. When the data block just fills the shift register SR, the arithmetic unit AU obtains at input 74 a rotation vector from an external memory and begins its operation. The next block of $2^{n-m}$ data samples are sent to the arithmetic unit which now produces two complex number outputs $X_{a,m+1}$, $X_{b,m+1}$ in response to the two complex number inputs $X_{a,m}$ and $X_{b,m}$. One of the outputs $X_{a,m+1}$ is immediately transferred over path 29 through switched connection 3$b$ to a next successive stage while the other output $X_{b,m+1}$ is returned to the input path 11 of shift register SR through switched connection 3$a$. Thus, in the interim period when shift register SR is being filled with new input data, then the former contents of shift register SR containing the earlier transferred blocks are transferred to the next stage. With respect to all the data, the arithmetic unit AU computes the complex number two-point transform $X_{a,m+1} = X_{a,m} = X_{b,m}e^j\phi$ and $X_{b,m+1} = X_{a,m} - X_{b,m}e^j\phi$, where $\phi$ is the radian value determined by the transform number $m$ and the position of the sample pair in their original position order of succession, $a$ and $b$.

Referring now to FIG. 2B, there is shown a more detailed implementation of the logic module set forth in FIG. 2A. It should be recalled that the time varying analog signal values are converted to a binary digital equivalent. It should further be recalled that many applications of sampled data signals require processing of the original signal, sometimes called the Real signal, and the same signal shifted 90° out of phase therewith. This is sometimes called an Imaginary signal. Each of the data points may be represented by a complex number. Accordingly, the Real and the Imaginary signals are represented collectively by complex numbers. Furthermore, because the same two-point transform is applied to both the Real and Imaginary signals, it is possible to share the arithmetic unit between them. This fact is amply illustrated in FIG. 2B. The Real signal is applied to input 4$a$, while the digits corresponding to the Imaginary input signal are applied to 4$b$. Arithmetic unit AU is shown in relationship to shift registers 16$a$ and 16$b$ and externally programmed switches $S_{4a,b}$, $S_{12a,b}$, $S_{14a,b}$, and $S_{16a,b}$.

Referring now to the Real signal processing, the data input 4$a$ is switchably connected through switch $S_{4a}$ to either multiplier 32 or delay 14$a$. When $S_{4a}$ is coupled to multiplier 32, the portion of the Real signal input constituting the Real component of the complex number $X_{b,m}$ is fed into the multiplier 32.

Switch $S_{12a}$ connects the shift register 16$a$ to either the $X_{b,m+1}$ output of adder 38 through delay 40$a$ or to the $X_{a,m}$ input of the Real signal through switch $S_{4a}$ and delay 14$a$. Similarly, switch $S_{14a}$ couples register 16$a$ to the output through delay 18$a$ or applies the input $X_{a,m}$ to adders 38 and 34. It should be noted that the Imaginary signal input applied at 4$b$ is switchably connected to multiplier 32 simultaneously with the real portion of the signal, and similarly to shift register 16$b$ through delay 14$b$ and switch $S_{12b}$. Also, register 16$b$ is selectively coupled to accept the $X_{b,m+1}$ output from adder 38 that is transmitted through delay 40$b$ and also through switch $S_{12b}$. Shift register 16$b$ is selectively coupled through switch $S_{14b}$ to the Imaginary output through delay 18$b$, as well as coupling the Imaginary signal $X_{a,m}$ component into adders 38 and 34.

Switches $S_{16a,b}$ by selectively connecting delays 36$a$ and 18$a$ in the case of switch $S_{16a}$ and delays 36$b$ and 18$b$ in the case of switch $S_{16b}$ permit the Real and Imaginary two-point transforms to be read out simultaneously with the application of a new complex input sample. Thus, $X_{a,m+1}$ and $X_{b,m+1}$ constituting the Real signal transform appear respectively through delays 36$a$ and 18$a$. Likewise, $X_{a,m+1}$ and $X_{b,m+1}$ constituting the Imaginary signal transform appear respectively through delays 36$b$ and 18$b$. The rotation vector is applied as an input to multiplier 32.

In order to analyze the gross operation of the module, let us recall the formulas $$X_{a,m+1} = X_{a,m} + X_{b,m}e^{j}\phi$$

$$X_{b,m+1} = X_{a,m} - X_{b,m}e^{j}\phi$$

The first step in solving the equations is to multiply $e^{j}\phi$ by $X_{b,m}$. The $X_{a,m}$ and $X_{b,m}$ are obtained from a serial storage shift register where Real and Imaginary components are stored in parallel. The $e^{j}\phi$ term is of the form $\cos\phi + j\sin\phi$. This is stored in rotation vector storage means 58. The correct $e^{j}\phi$ term is sent to the arithmetic unit AU by external control logic. This will be discussed in greater detail with reference to FIGS. 6A and 6B.

The complex multiplication is done in parts. This consists of four real multiplications to form all the products of the two complex words and two real additions to form the final answer. The next step then is to add and subtract this product from $X_{a,m}$ to compute the final sum of the transform. This requires four additions.

Referring now to FIG. 2B, the $X_{b,m}$ input is applied in 1's complement format and is converted into sign plus magnitude format. The multiplier 32 works on numbers in sign plus magnitude format because of its economy and convenience. The multiplier 32 output is also converted into 1's complement format. Adders 34 and 38 utilize 1's complement format in addition. Also, the final output is further in 1's complement format.

The detailed logic of multiplier 32 is not set forth explicity as this is deemed to be well within the purview of one having ordinary skill in the art. In this regard, reference may be made to any one of a number of standard known works, such as "Logic Design of Digital Computers" by Montgomery Phister, Jr., New York, John Wiley & Sons, 1959; "A Survey of Switching Circuit Theory" by McCluskey, Jr. and Bartee, McGraw-Hill Book Company, Inc., New York, 1962; and "Arithmetic Operations in Digital Computers" by Richards, published by de Van Nostrand Company, Inc., New York, 1955. Suffice it to say that in the multiplier, provision must be made for clocking the $X_{b,m}$ terms in. The Real part may be stored in one register and the Imaginary part in another register, all within multiplier 32. In this regard, attention is directed to pages 136 through 176 of Richards for several forms of multiplier logic.

The $X_{b,m}$ terms should take only one word time in order to be clocked into these multiplier registers. It is evident that the terms should be available from these registers in the form of the logical variable $X_{b,m}$ and its logical complement form $\overline{X}_{b,m}$.

The associated $e^{j}\phi$ may be read in a multiplier buffer register also in parallel format. Preferably, it should be read in at the same time that $X_{b,m}$ is read in. Thus, both $e^{j}\phi$ and $X_{b,m}$, both their Real and Imaginary parts, are available to be selected by the multiplier. In the design of such multiplier, it must be anticipated that several different clock times are necessary for forming different products. Now, the multiplication of two complex numbers should yield four partial products, of which two are Real and two are Imaginary. A sign determination circuit can functionally comprise two cascaded half adders in sign magnitude multiplication. If each multiplier and the multiplicand form the same sign, then the partial product is positive. If the signs mismatch, then the partial product is negative.

The output of multiplier 32 is $X_{b,m}e^{j}\phi$. This output is applied respectively as an input over two paths to adders 34 and 38. When either serial register 16a or 16b is coupled to respectively paths constituting the $X_{a,m}$ inputs for adders 34 and 38 through respective switch connections $S_{14a}$ and $S_{14b}$, then $X_{a,m}$ is also applied as an input to adders 34 and 38. The output of adder 34 provides the sum $X_{a,m} + X_{b,m}e^{j}\phi$. This sum is provided for the Real signal through delay 36a and the Imaginary signal through delay 36b. In a similar manner, the output of adder 38 is of the form $X_{a,m} - X_{b,m}e^{j}\phi$. This difference for the Real signal appears through delay 40a. It is switchably connected to the Real output through switch $S_{12a}$, register 16a, switch $S_{14a}$, and delay 18a. The difference relating to the Imaginary output appears through delay 40b. It is switchably connected to the Imaginary output through switch $S_{12b}$, register 16b, switch $S_{14b}$, and delay 18b. It is further apparent that the reading out of the two-point transform $X_{a,m+1}$, $X_{b,m+1}$ for the Real and Imaginary signals is achieved by alternating respective switches $S_{16a,b}$ between their respective contacts.

Referring now to FIG. 3A, modules 50, 52, and 54 are serially arranged with data being applied at input 56 to the $m=1$ module 50. Control counter 60, having counter stages 68, 70, and 72 corresponding to the modules, performs a timing or frequency division function as activated by the word clock input 76. Each of the modules contains the logic shown in FIG. 2B. Paths 62, 64, and 66 couple corresponding counter stages 68, 70, and 72 to modules 50, 52, and 54.

Rotation vector storage 58 supplies vector information $e^{j}\phi$ over a common bus 74 to each of the modules. The rotation vector storage 58 may comprise a read-only memory which is a table of sines and cosines shared by all $m$ modules. In FIG. 1, N/2 different pairs of sines and cosines are read to process one block of N samples. It is important to note that exactly M arithmetic units and exactly N complex number data points of storage are needed in the system. The first transform output from module 54 appears at terminal 78 immediately after the last data sample in the block of N data samples has been entered at the input 56.

The FFT processor shown in FIGS. 3A and 3B has a considerable speed advantage. However, one-word delays must be inserted in or between the processing stages 50, 52, 54, etc., to make use of this speed. These delays, discussed in reference to FIG. 2B, permit each module to begin computation at the start of a word time rather than waiting for the preceding modules to compute the input it requires.

These intermodule delays do not appreciably complicate the control circuitry of the FFT processor. It is only necessary to delay the data input 56 and the rotation vector storage input 58 to each of the modules 50, 52, and 54 by a number of word times equal to the total delay of the data input. The control input to each module is a bit from the control counter 60. These bits may be transmitted to the modules over paths 62, 64, and 66 from binary counter stages 68, 70, and 72, respectively. The bits may be transmitted through actual delays (not shown). Delay corrected control words for each module may be computed by subtracting the appropriate delays from the control counter word.

Leaving the question of delays for a moment, each time a bit in the control counter 60 word changes from a zero to a one, the corresponding module controlled by that bit begins performing two-point transforms using a new rotation vector $e^{j}\phi$. Rotation vectors are therefore required at an average rate of one for each word time. These may be distributed to the processing modules on a single data bus 74. When intermodule and control delays are considered, then the average rate at which rotation vectors are required is unchanged. However, buffer storage must be included between the data bus 74 and the modules for delay compensation.

Referring now to FIG. 3B, there is shown a more detailed block diagram of the embodiment illustrated in FIG. 3A. The time varying signal applied at input 56 is in analog form and converted to digital form by analog-to-digital converter 57. A clock input signal is applied on bus 76 for synchronizing converter 57, counter 60, and each of the shift register portions 50*a*, 52*a*, and 54*a* of the logic modules. As is apparent from the discussion of FIGS. 2A and 2B, the arithmetic units 50*b*, 52*b*, and 54*b* circulate a portion of their results into and out of the corresponding shift register. The stages 68, 70, and 72 of counter 60 perform a frequency division function. It should be noted that the digital word from converter 57 is applied in parallel to the appropriate gated shift register and gated in and out of the various registers in parallel. Of course, such an operation could also be done entirely in serial fashion.

Rotation vector storage 58 comprises a storage medium in which a tabular form of sines and cosines may be stored in vector addresses corresponding to the position indices *a* and *b* of the extracted data pair $X_{a,m}$ and $X_{b,m}$ in the serially arranged information. The position angle $\phi = 2\pi i/2^{m}$ where $$0 \leq i < 2^{m-1}$$

$$1 \leq m \leq n$$

It is apparent that $\phi$ is determined by the length $2^{n-m}$ of the shift register involved with each module since each module operates on strings of data of given lengths. This fact may be observed by considering that *m* indicates the number of the arithmetic unit and that *i* lies within the range $O \leq i < 2^{m-1}$. The variable *i* is defined as the greatest integer not greater than $a/2^{n-m+1}$.

The structure of FIGS. 3A and 3B may be readily modified to calculate inverse transforms when the spectral components are given in scrambled order. This structure permits the same trade-off of channels processed for data length per channel by taking outputs at an intermediate stage.

Figure 4:
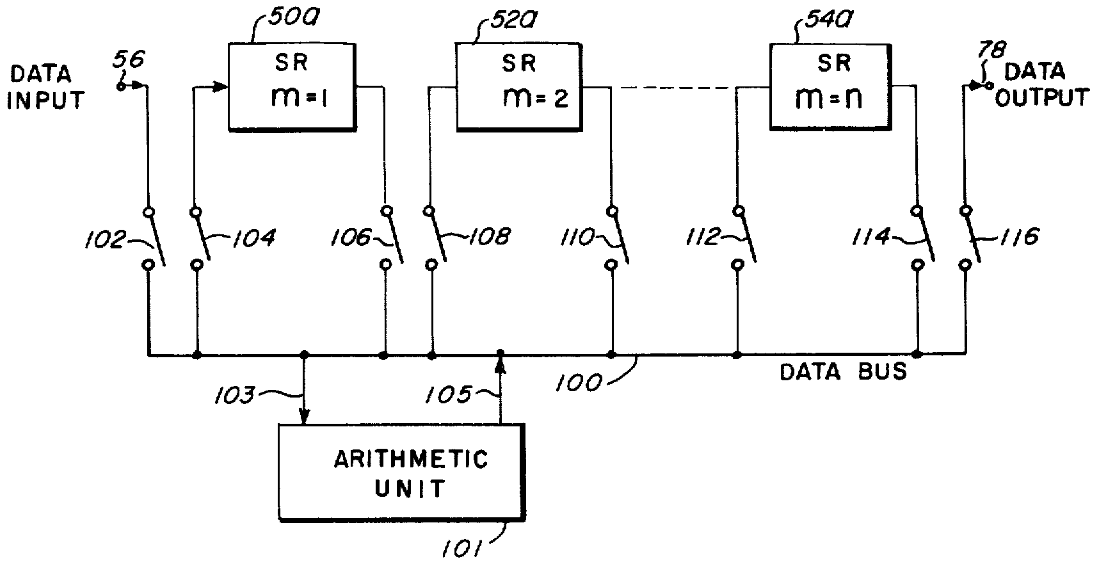
FIG. 4 shows a block diagram of one embodiment of the invention in which an arithmetic unit is time shared with all of the modules on a common bus.

Referring now to FIG. 4, there is shown an arithmetic unit 101 time shared with shift registers 50*a*, 52*a*, and 54*a*, on a common data bus 100. The output of shift register 50*a* results in N/2 independent two-point transforms. The output of shift register 52*a* yields N/4 independent four-point transforms. Likewise, the output of shift register 54*a* yields N/8 independent eight-point transforms. If two independent streams of complex number data were applied at data input 56 and interleaved one with the other, then the $m$= first stage (50*a*) would produce two independent discrete Fourier transforms of each data stream. The spectral component of each channel of data is outputted before the spectral frequency is changed. What this means for pulsed radar or sonar is that where the data representing many range samples is received, the data will be processed in order of arrival without modification and without requiring the data to be re-assembled into consecutive and non-interleaved data streams.

The switches 102, 104, 106, 108, 110, 112, 114, and 116 are symbolically shown to indicate that the arithmetic unit 101 operating on a common data bus may time share and process the output from any of the logic modules 50*a*, 52*a*, and 54*a*.

Figure 5B:
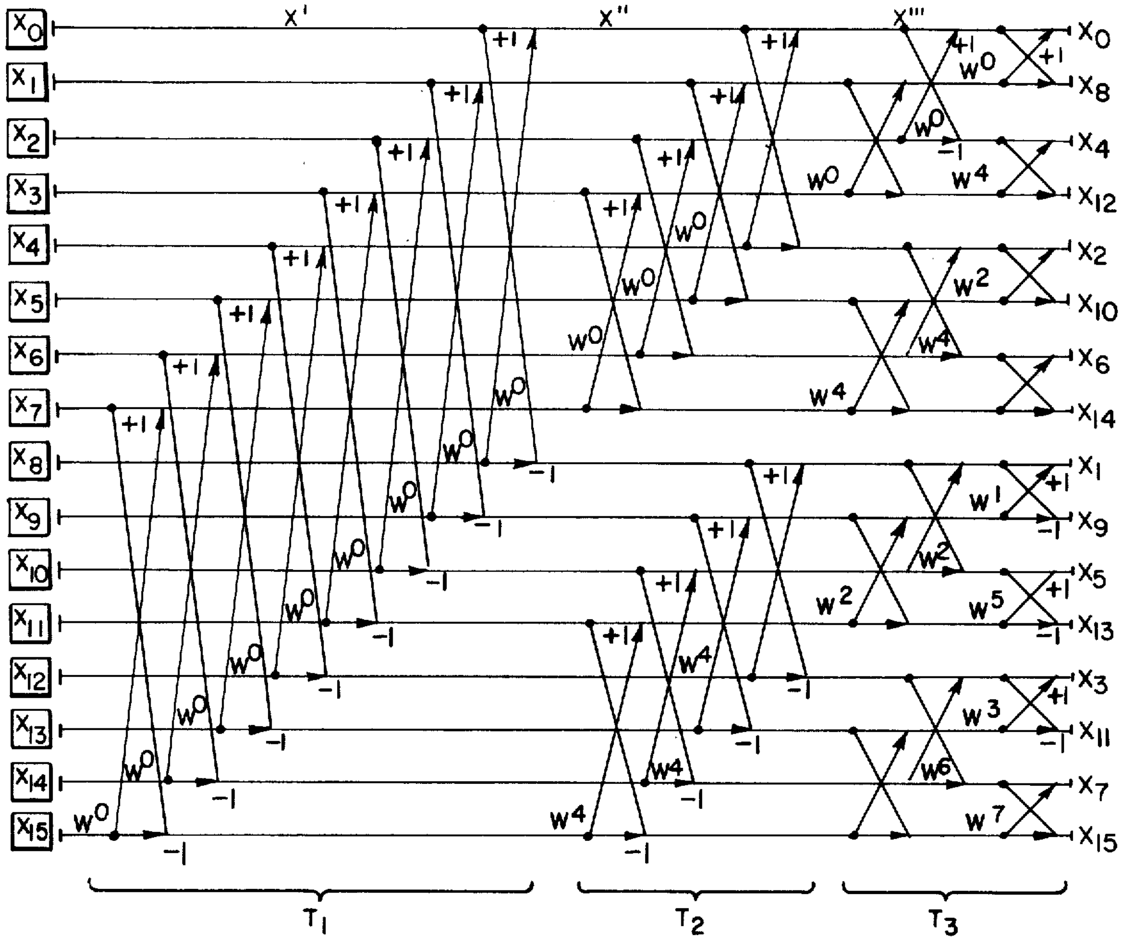
FIG. 5B is a detailed signal flow diagram of a 16-point transform as performed by the invention, while FIG. 5C diagrammatically illustrates the effect of the rotation vector $e^{j\phi}$.

Referring now to FIG. 5B, there is shown a signal flow diagram of the Cooley-Tukey algorithm for a 16-point transform. The input time samples are in natural or monotonically progressive order $x_0, x_1, x_2 - x_{15}$. The transform results in outputs $X_r$ in bit reversed order $X_0, X_8, X_4 - X_{15}$.

In order to implement the transformation, it is necessary that successive modules must wait until the preceding module has completed its two-point transform and the $X_{a,m+1}$ results have been passed on before the next module can begin transforming.

Alternatively, this signal flow diagram represents a series of operations to be performed on R-tuples of words of various distance in the data string $x_0 - x_{15}$. A data manipulating system which implements this algorithm must sequentially access all word R-tuples of distance $R^{n-1}$, $R^{n-2}$ 13 $R^0$ in the data string for a total of $ZnR^n$ accesses for a data string of length $R^n$. The parameter R is the radix of the algorithm and *n* is an integer. The value R is usually two or three. In FIG. 5B, R = Z and the data string is of length $2^4$. Thus, for the first transformation time interval $T_1$, the distance between pairs of digits which are to be transformed together is $d = R^{n-m} = 2^{4-1} = 8$, where *m* is the transformation number. Accordingly, the following digit pairs are selected: $x_0, x_8; x_1, x_9 - x_7, x_{15}$. During the second transformation time interval $T_2$, the distance between pairs of digits taken from the transformation results of the first time interval $T_1$ is $d= 2^{4-2}= 4$. Then, the digits $x'$ occupying the former cells may be combined as follows: $x'_0, x'_4; x'_1, x'_5 - x'_{11}, x'_{15}$. Similarly, during the third transformation interval $T_3$, the digits are selected with a distance of two units apart. Thus, the digits $x''$ would be combined as follows: $x''_0, x''_2; x''_1, x''_3 - x''_{13}, x''_{15}$.

As may be recalled, with respect to the direction of the signal flow diagram in FIG. 1, the nodes at any point represent the summation of values terminating at the node with those nodes which have a weighting other than one. Thus, $x''_{15}= x'_{11} - W^4x'_{15}$.

Figure 5A:
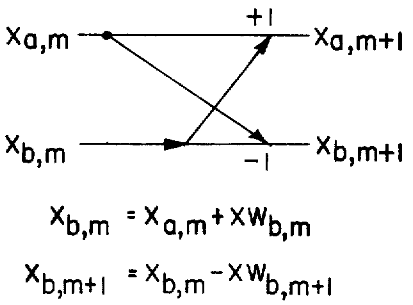
FIG. 5A is the signal flow diagram of a single module.

FIG. 5A is a simplified signal flow diagram illustrating the two-point transform. As can be seen, the complex number $X_{b,m}e^{j}\phi$ is algebraically added to $X_{a,m}$ to form $X_{a,m+1}$. As can be seen in this figure, the rules for vector addition are the same as shown in FIGS. 1 and 5B.

Figure 5C:
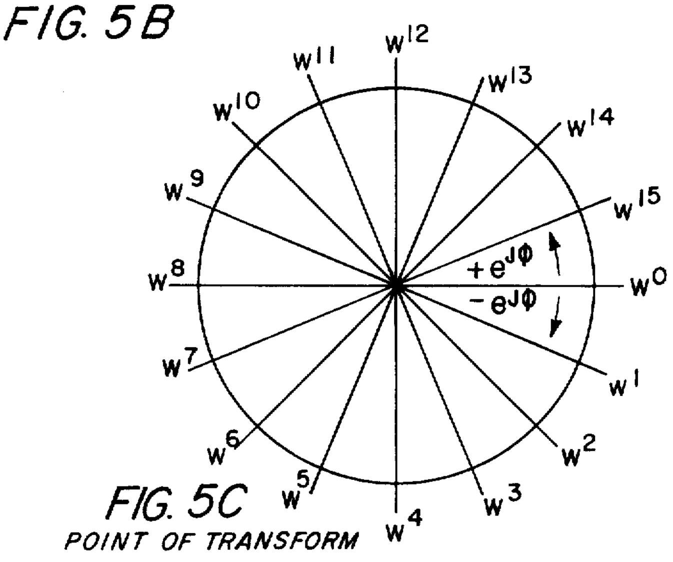

Referring now to FIG. 5C, there is shown the rotational aspect of the vector $e^{j}\phi$. $e^{+j}\phi$ indicates a counterclockwise rotation of the vector, whereas $e^{-j}\phi$ is indicative of a clockwise rotation of the vector.

Figure 6A:
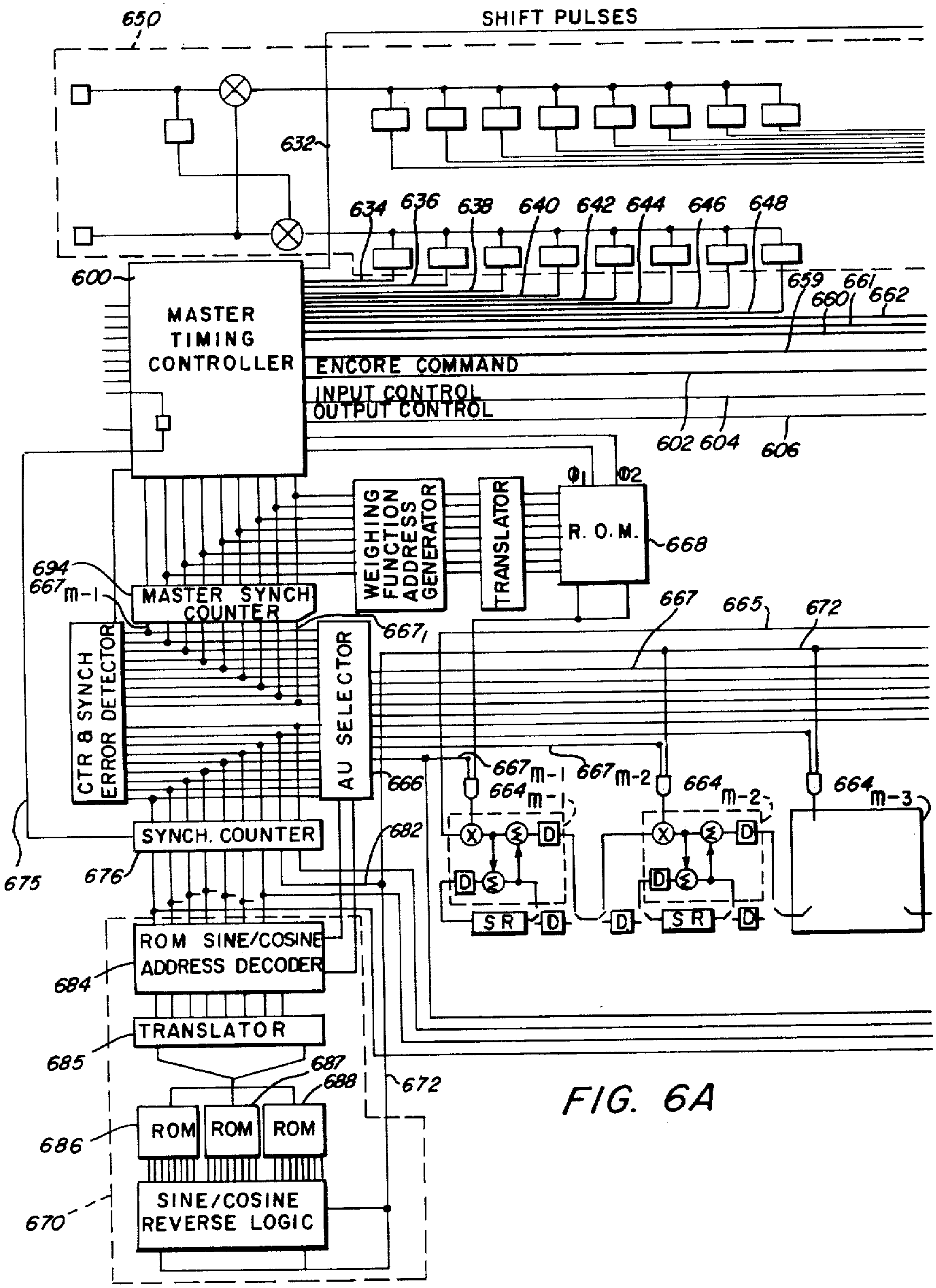
FIGS. 6A and 6B are detailed logic block diagrams of the invention using the modules of FIGS. 2A and 2B and arranged generally as in FIG. 3.
Figure 6B:
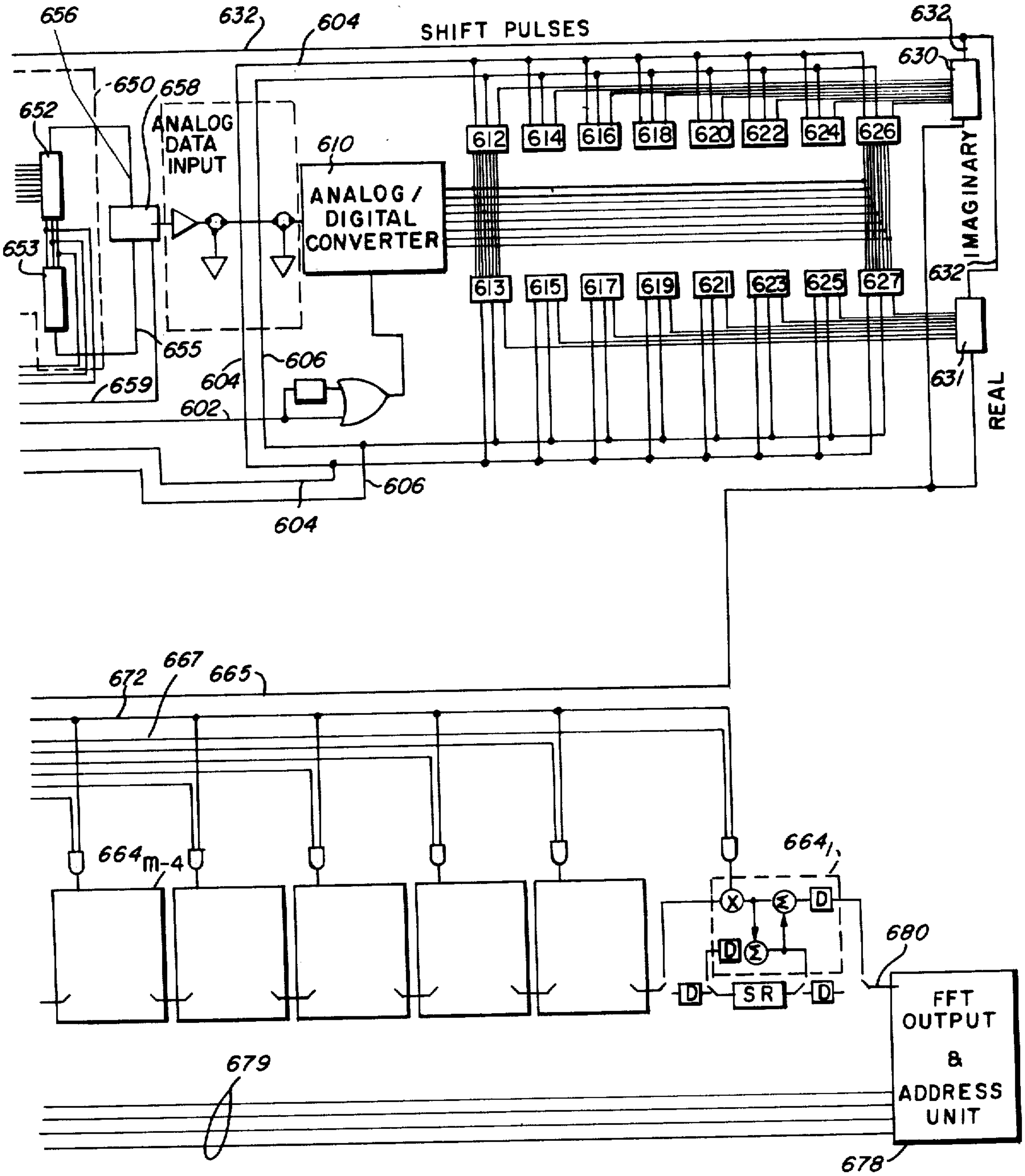

Referring to FIGS. 6A and 6B, there is shown a detailed block diagram of the invention. A master or basic clock for the entire system is contained within master timing control apparatus 600. The selected hard wire output lines 602, 604, 606 activate remote functional units of the system. Path 602 activates analog-to-digital converter 610. Input control path 604 activates register means 612 through 628 to respectively accept digital information from A/D converter 610. Output control path 606, also coupling register means 612 through 628, causes the contents of register means 612 through 628 to be entered into Real register 631 and Imaginary register 630. Shift pulse path 632 is terminated in Real and Imaginary registers 630 and 631. Pulses on this path initiate the serial read-out of the contents of those registers. Paths 634, 636, 638, 640, 642, 644, 646, and 648 activate sample and hold circuits of the Real and Imaginary channel input means 650. As previously discussed, these means essentially are used for radar applications and other applications where it is desired to form quadrature or separate channel signals. Thus, sample data input signals multiplied by a sinusoid component are entered in Real register 652. Sample data signals multiplied by a sinusoid 90° out of phase with the first sinusoid are entered into Imaginary register 653. The contents of these registers are respectively serially read out on paths 656 and 655 and are accordingly demultiplexed through switch means 658 as energized over path 659 from the timing controller 600. The parallel entry of data into selector switches 652 and 653 is controlled over paths 660, 661, and 662.

Logic modules $664_{m-1}$, $664_{m-2}$— $664_1$ are shown in cascade. Each of the shift registers SR is switchably connected in series with the shift register SR of the next successive logic module. Data is entered into the logic module cascade on path 665 from Imaginary selector switch 630 and Real selector switch 631. The activation of the arithmetic unit of a preselected logic module is controlled by AU selector 666 over paths $667_{m-1}$, $667_{m-2}$— $667_1$. The rotation $e^j\phi$ vector is also gated into the corresponding logic module from either read-only memory 668 (for logic module $664_{m-1}$) or read-only memory array 670 over path 672 (for logic modules $664_{m-2}$— $664_1$). The timing sequence for initiating the operation of the logic modules is controlled by Master Timing Controller 600 through Master Synch Counter 674 over paths $667_{m-1}$— $667_1$. Similarly, the activation of the appropriate vector is derived from Master Timing Controller 600 over path 675 to Synch Counter 676. Synch Counter 676 also regulates FFT output and address unit 678 over path 679. It will be observed that FFT output unit 678 is appropriately fed the Fourier transform data from module $664_1$ over path 680.

The two-point transformation data and the progressive shifting and transforming of this data from the first logic module $664_{m-1}$ through $664_1$ is described in detail with regard to FIGS. 1 through 5B. Broadly, the regularly spaced digitalized time data samples are entered on line 665 into the first module and are progressively shifted under control of the Master Timing Controller 600 and the appropriate Synchronizing and Selecting units 674, 666 to enable the presentation of the rotation vector from either memory unit 668 or memory arrangement 672 to be present at the appropriate logic module multiplier. The read-only memories (ROM) may be constructed from appropriate permanent memory material or from any form of suitable bistable remanent magnetic material such as ferrite core arrays with an automatic rewriting of data after read. Synch Counter 676 also provides an input on path 672 over path 682 in order to assure the proper gating in the rotation vector information.

Memory arrangement 670 includes an address decoder 684, a translator 685, driving each of three read-only memories 686, 687, and 688. The address deoder is stimulated by the Synch Counter 676 upon signals on path 675 from Timing Controller 600.

It is believed that the logical design of each of the requisite subordinate units is well within the scope of the man ordinarily skilled in this art. For example, analog-to-digital converter 610 may range from a shaft position encoder to an appropriate diode resistance matrix. The sample and hold circuits of the Real and Imaginary channel input means 650 may be served by weighted capacitive means. These and other arrangements described in detail, while suitable for one embodiment of this invention, are to be taken as suggestive and not as limiting. As previously mentioned, a large variety of bistable remanent switching devices arranged in addressable register form may be devised to satisfy the requirements of this invention.

We claim:

1. A system for performing a Fourier transform comprising a plurality of serially coupled computational stages, each stage comprising in combination:
   - means for performing arithmetic operations upon sets of data;
   - means for storing at least portions of said sets;
   - means for coupling at least portions of the results of said arithmetic operations upon said sets to said storing means; and said system further comprising
   - single means for controlling each of said coupling means, said controlling means operating independently from any stored set of instructions.

2. The combination of claim 1 wherein said means for performing arithmetic operations comprises means for performing at least a portion of a discrete Fourier transform upon said sets.

3. The combination of claim 2 wherein said storing means comprises shift register storage means.

4. The combination of claim 2 wherein said storing means comprises an addressable register.

5. The combination of claim 2 wherein said controlling means comprises a cyclical binary counter.

6. In combination:
   - a single means for providing a cyclic count;
   - a plurality of memory means; and
   - arithmetic computation means coupled to each of said memory means for calculating a discrete Fourier transformation upon a set of data samples, said computation means including means for weighting at least some of said samples, said plurality of memory means and said arithmetic computation means all being synchronized by said single count providing means.

7. The combination of claim 6 wherein said means for providing a cyclic count comprises a cyclical binary counter.

8. The combination of claim 6 wherein said memory means comprises shift register means.

9. The combination of claim 7 wherein said memory means comprises an addressable register.

* * * * *